(12) United States Patent  
Silver et al.

(10) Patent No.: US 11,225,893 B2  
(45) Date of Patent: Jan. 18, 2022

(54) COMPACT SELECTIVE CATALYTIC REDUCTION SYSTEM

(71) Applicant: Perkins Engines Company LTD, Peterborough (GB)

(72) Inventors: Ronald Silver, Peoria, IL (US); Alexis Eden, Thrapston (GB); Leo Shead, Stamford (GB); Ben Reid, Shoreham-by-Sea (GB); Mark Kennedy, Nottingham (GB); Ridwan Kureemun, Luton (GB); Hannah Petto, Peterborough (GB); Dan Pierce, Deadwood, SD (US)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/490,857

(22) PCT Filed: Mar. 8, 2018

(86) PCT No.: PCT/EP2018/055826  
§ 371 (c)(1),  
(2) Date: Sep. 3, 2019

(87) PCT Pub. No.: WO2018/162673  
PCT Pub. Date: Sep. 13, 2018

(65) Prior Publication Data  
US 2020/0003099 A1    Jan. 2, 2020

(30) Foreign Application Priority Data  
Mar. 8, 2017    (EP) .................................... 17159838

(51) Int. Cl.  
*F01N 3/20*    (2006.01)  
*F01N 3/28*    (2006.01)

(52) U.S. Cl.  
CPC ............... *F01N 3/208* (2013.01); *F01N 3/20* (2013.01); *F01N 3/28* (2013.01); *F01N 3/2803* (2013.01)

(58) Field of Classification Search  
None  
See application file for complete search history.

(56) References Cited

U.S. PATENT DOCUMENTS

2008/0041040 A1*  2/2008  During ................. F01N 3/0821  
                                                      60/295  
2009/0205325 A1*  8/2009  Kistner .................... F01N 3/28  
                                                      60/297

(Continued)

FOREIGN PATENT DOCUMENTS

CN          101999036         3/2013  
EP          3 121 404 A1      1/2017

(Continued)

OTHER PUBLICATIONS

International Search Report for Application No. PCT/EP2018/055826; dated May 9, 2018.

(Continued)

*Primary Examiner* — Jelitza M Perez  
(74) *Attorney, Agent, or Firm* — von Briesen & Roper, s.c.

(57) ABSTRACT

A selective catalytic reduction (SCR) system for treating exhaust gas from a diesel engine is provided, along with a method of assembling such a system. The system comprises a frame, a SCR catalyst contained within a SCR canister, and an ammonia oxidation catalyst contained within an ammonia oxidation canister. Each of the SCR and ammonia oxidation canisters is removably attached to the frame.

14 Claims, 3 Drawing Sheets

(56) References Cited

U.S. PATENT DOCUMENTS

| | | | |
|---|---|---|---|
| 2010/0031644 A1* | 2/2010 | Keane | F01N 13/1805 60/295 |
| 2010/0205945 A1* | 8/2010 | Kowada | F01N 13/1822 60/297 |
| 2010/0236224 A1* | 9/2010 | Kumar | F01N 3/2073 60/297 |
| 2011/0023452 A1* | 2/2011 | Gisslen | F01N 13/1827 60/272 |
| 2011/0099978 A1* | 5/2011 | Davidson | B01D 53/9495 60/274 |
| 2012/0017574 A1* | 1/2012 | Hasan | F01N 13/1805 60/297 |
| 2014/0237998 A1 | 8/2014 | Fahrenkrug et al. | |
| 2014/0348716 A1* | 11/2014 | Park | B01D 53/94 422/171 |
| 2015/0184566 A1* | 7/2015 | Tanaka | F01N 3/2066 60/297 |
| 2015/0198069 A1* | 7/2015 | Fischer | F01N 3/035 422/170 |
| 2016/0201543 A1* | 7/2016 | Ashikawa | B60P 1/04 180/309 |

FOREIGN PATENT DOCUMENTS

| | | |
|---|---|---|
| JP | 2005155404 | 6/2005 |
| JP | 2010196523 | 9/2010 |
| JP | 2015523490 | 8/2015 |
| WO | WO 2013/160657 A1 | 10/2013 |
| WO | WO 2014/167351 A2 | 10/2014 |
| WO | 2016001034 | 1/2016 |

OTHER PUBLICATIONS

Automobile Energy Saving and Pollutant Emission Control Technology edited by Chunli Xiw et al.; pp. 210-213, Northeast Forestry University Press.

* cited by examiner

COMPACT SELECTIVE CATALYTIC REDUCTION SYSTEM

CROSS-REFERENCE TO RELATED APPLICATION

This Application is a 35 USC § 371 US National Stage filing, of International Application No. PCT/EP2018/055826 filed on Mar. 8, 2018 which claims priority under the Paris Convention to European Patent Application No. 17159838.6 filed Mar. 8, 2017.

FIELD OF THE INVENTION

The present invention relates to selective catalytic reduction (SCR) systems which treat nitrogen oxides in the exhaust gases of diesel engines. More specifically, the present invention is a compact SCR system for use in vehicular applications in particular.

BACKGROUND OF THE INVENTION

SCR systems are known and are generally included in the exhaust systems of diesel engines in order to treat the exhaust gases of such engines. Such systems involve the introduction of diesel exhaust fluid (DEF) into exhaust gas flowing in an exhaust passage of an engine. The DEF contains urea which undergoes a hydrolysis and/or thermolysis within the exhaust passage whereby ammonia is produced. The ammonia passes into a SCR catalyst where it reacts with the exhaust gas. In this reaction any nitrogen oxides (NOx) present in the exhaust gas are converted to nitrogen and water before passing out of the exhaust into the atmosphere.

A SCR system can include the following components:
- A diesel oxidation catalyst (DOC), which oxidises any hydrocarbons and carbon monoxide to produce carbon dioxide and water, and oxidises nitrogen oxide to produce nitrogen dioxide;
- A DEF dosing unit and injector, which injects the DEF into the exhaust passage;
- A hydrolysis catalyst, which hydrolyses the urea in the DEF in order to convert it to ammonia as efficiently as possible;
- An SCR coated-on filter, or diesel particulate filter (DPF), which traps particulate matter in the exhaust flow;
- A SCR catalyst, which catalyses the reaction between the NOx and ammonia now in the exhaust passage to produce nitrogen and water; and
- An ammonia oxidation (AMOx) catalyst, which oxidises any ammonia remaining in the exhaust gas downstream of the SCR to ensure that significant amounts of ammonia do not "slip" out into the atmosphere.

Along with the SCR catalyst and DEF dosing unit a SCR system will include some, if not all, of the other components listed above. In automotive applications, this can cause problems as the size of the components and the exhaust passage(s) connecting them can be difficult to package within the confines of a vehicle body (e.g. the engine bay/compartment) where space is at a premium. In addition, these components will need to be serviced and/or replaced during the lifespan of the vehicle, and this can increase maintenance time and associated cost if the components are not relatively easy to access and remove.

One solution to the packaging issue has been proposed is U.S. Pat. No. 8,820,059, in which a DOG and a DPF are arranged in parallel with a SCR catalyst, with the components lying on a mount. A DEF dosing unit is provided in a passage which connects opposing ends of these two components. In this arrangement an AMOx catalyst may be present but is not packaged with the aforementioned components.

It is an aim of the present invention to provide a SCR system which is as compact as possible whilst being readily accessible for maintenance. It is a further aim of the present invention to provide a SCR system in which optimal mixing of exhaust gas and DEF/ammonia is achieved without any detrimental increases in back pressure within the system.

SUMMARY OF THE INVENTION

According to a first aspect of the invention there is provided a selective catalytic reduction (SCR) system for treating exhaust gas from a diesel engine. The system comprises a frame, a SCR catalyst contained within a SCR canister, and an ammonia oxidation catalyst contained within an ammonia oxidation canister. Each of the SCR and ammonia oxidation canisters is removably attached to the frame.

According to a second aspect of the invention there is provided a method of assembling a SCR system for treating exhaust gas from a diesel engine of a vehicle. The method comprises the steps of providing a frame, and attaching the frame to the vehicle. A SCR canister containing a SCR catalyst is removably attached to the frame, and fluidly connected to an exhaust inlet. An ammonia oxidation canister containing an ammonia oxidation catalyst is removably attached to the frame. The ammonia oxidation canister is fluidly connected to the SCR canister and an exhaust outlet.

BRIEF DESCRIPTION OF THE DRAWINGS

A preferred embodiment of the present invention will, now be described, by way of example only, with reference to the following drawings, in which.

DETAILED DESCRIPTION OF THE DRAWINGS

Figure 1:
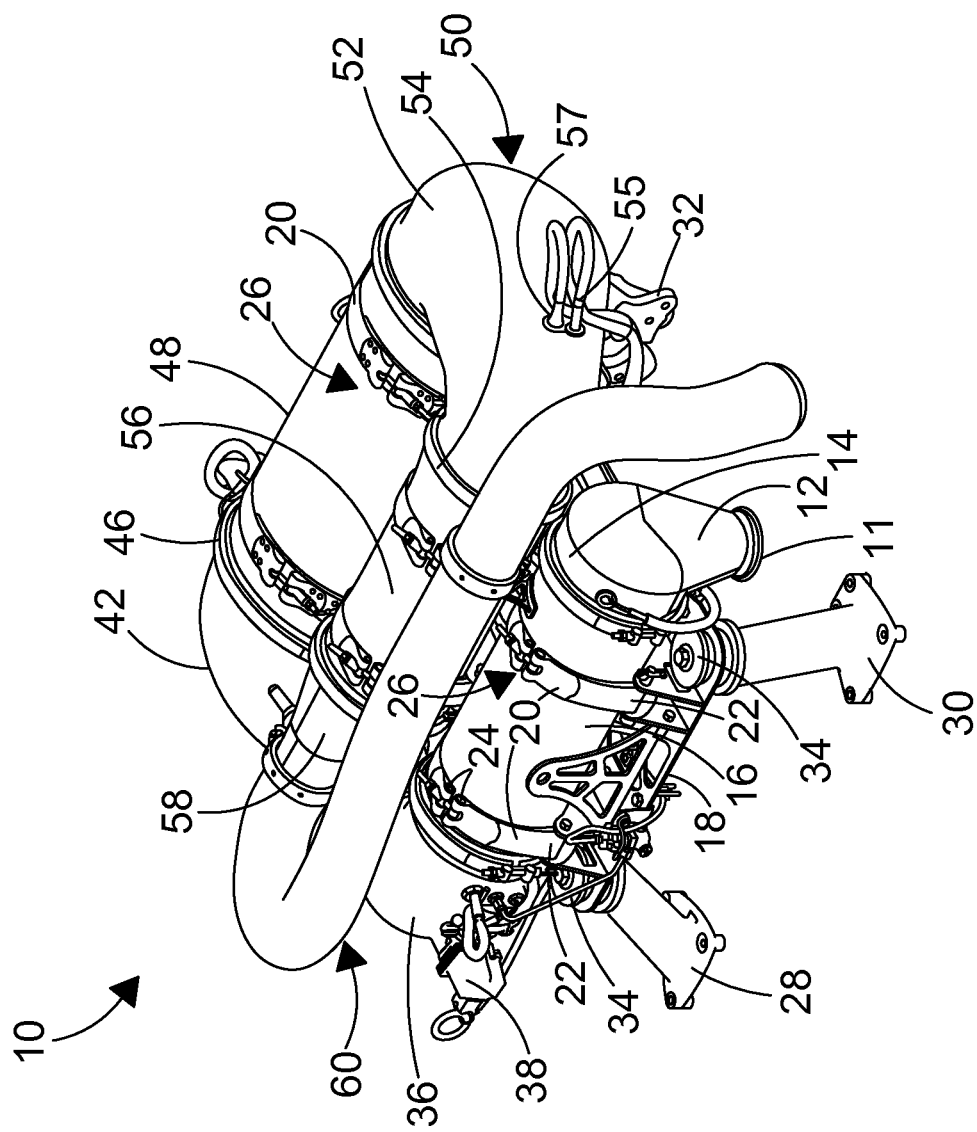
FIG. 1 is a perspective view of a selective catalytic reduction (SCR) system.
Figure 2:
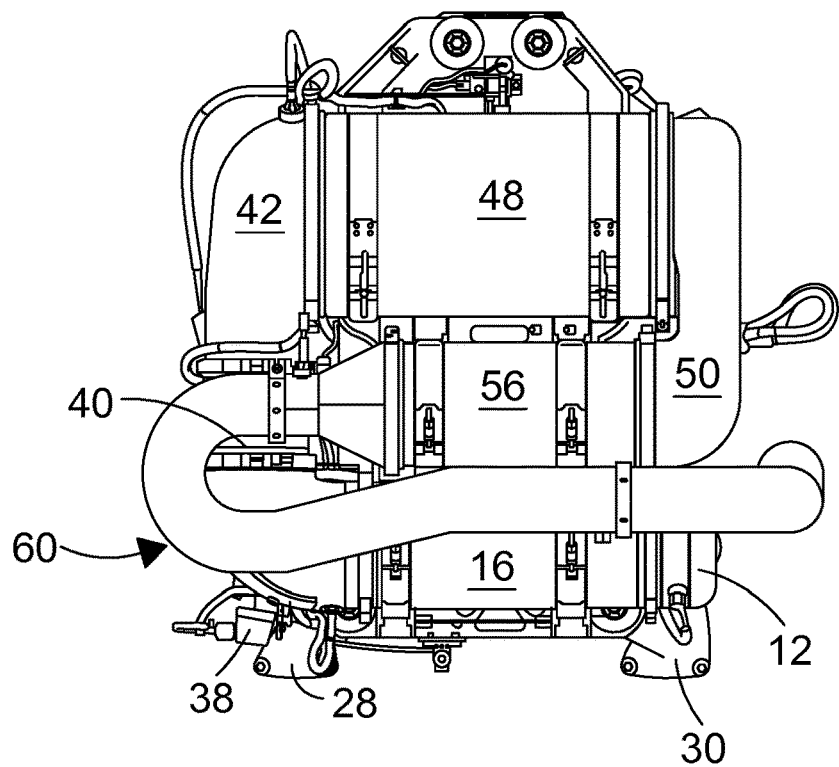
FIG. 2 is a top view of the SCR system.

A selective catalytic reduction (SCR) system suitable for automotive applications such as on a vehicle or work machine is shown in FIGS. 1-5. The system, generally designated 10, comprises an exhaust cap 12 which has a cap inlet 11 which in use will be connected to a diesel engine exhaust, and most likely a turbocharger outlet of the engine exhaust. The exhaust cap 12 also includes a cap outlet 14, which is substantially 90 degrees to the cap inlet 11 such that the cap 12 turns the exhaust flow through substantially 90 degrees so that it then proceeds in a generally horizontal direction. The cap outlet 14 has a cross sectional area which is greater than that of the cap inlet 11, so that the exhaust flow is expanding as it leaves the cap 12.

Immediately downstream of the exhaust cap 12 is a diesel oxidation catalyst (DOC) of a known type, which is housed within a removable DOC canister 16. The DOC canister 16 is supported by a cradle, or frame, 18 and is attached to the cradle by retaining straps 20. It should be noted that any references to the SCR system components or exhaust flow being "horizontal" in this description relate to an arrangement in which the cradle lies substantially horizontal in use. Therefore, for other applications in which the cradle does not lie substantially horizontal then "horizontal" should be interpreted as being substantially parallel to the plane of the cradle.

There are two pairs of straps 20 holding the DOC canister 16. Each strap 20 in a pair has one end 22 fixed to the cradle 18 and a free looped end 24 connected to the free end of the other strap making up that pair. The looped ends 24 of each pair of straps 20 are connected to one another using a known threaded fixing arrangement 26 which allows the straps to be tightened around the canister to secure it to the cradle 18, and can also be disconnected to open the straps and allow the canister to be removed when necessary.

The cradle 18 is supported on a pair of rear legs or supports 28, 30 and a front leg or support 32. Each of the legs or supports 28, 30, 32 is connected to the cradle 18 using elastomeric top mounts 34 in order to isolate the cradle from unwanted vibration.

Downstream of the DOC canister 16 is an elbow 36 which turns the exhaust flow substantially through 90 degrees whilst maintaining the generally horizontal flow path. Attached to the elbow 36 is a diesel exhaust fluid (DEF) dosing unit 38, which has an injector (not shown) and is connectable to a source of DEF so that it may inject the DEF into the exhaust flow as it passes through the elbow. The DEF injector extends into the interior of the elbow.

Figure 3:
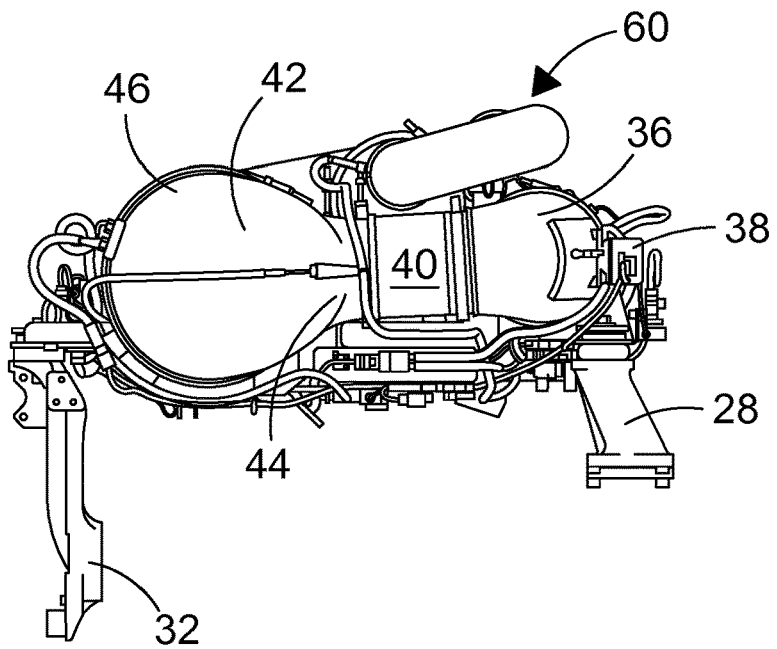
FIG. 3 is a left side view of the SCR system.
Figure 4:
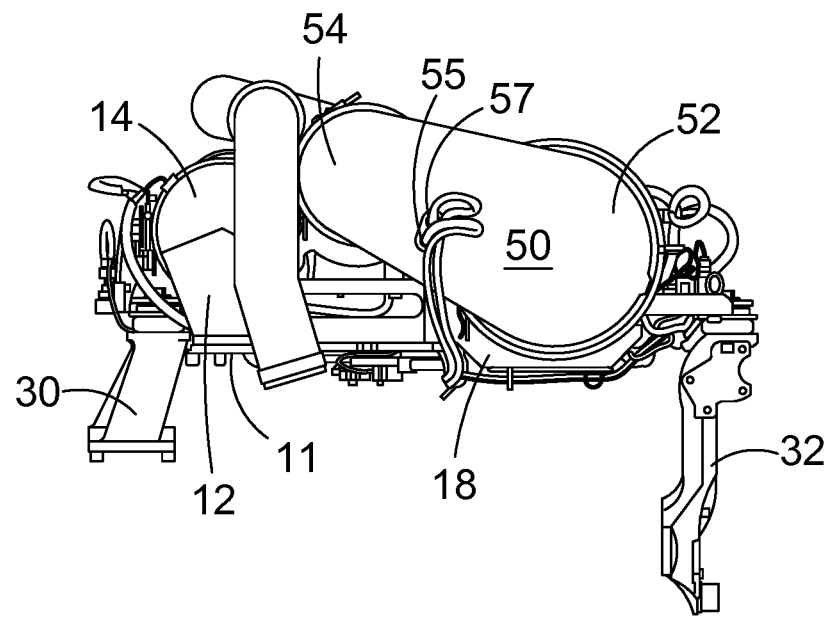
FIG. 4 is a right side view of the SCR system.
Figure 5:
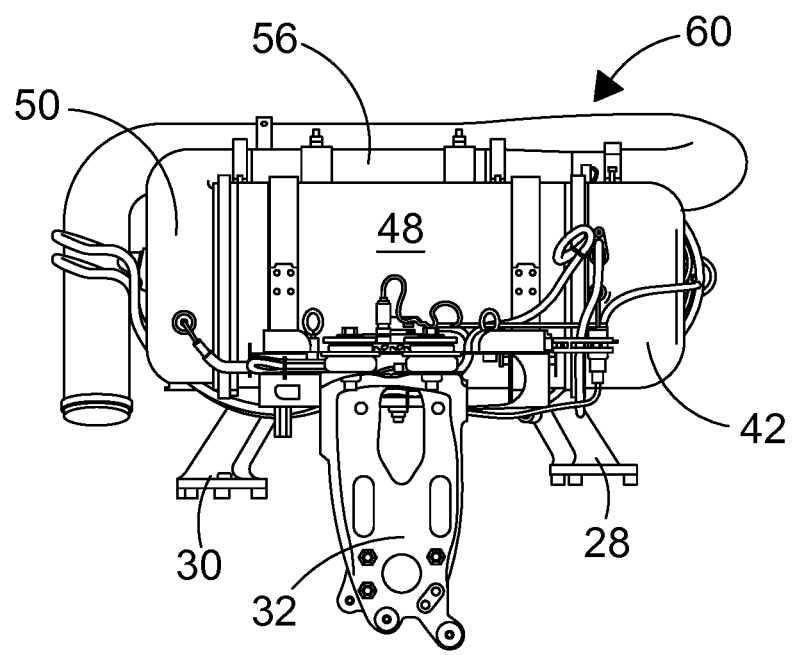
FIG. 5 is a front view of the SCR system.

Downstream of the elbow 36 is a hydrolysis catalyst ("hydcat") contained within a hydcat canister 40, which is best seen in FIG. 3. The hydcat canister 40 is releasably attached to the cradle 18 in the same manner as the DOC canister 16. In this preferred embodiment, the hydcat canister 40 is fixed to the elbow 36, whereby the hydcat canister, elbow and DEF dosing unit 38 are attached and detached from the cradle 18 as a single component. A mixer plate (not shown) may be placed in the hydcat canister 40 downstream of the hydcat so as to ensure homogenous mixing of the exhaust gas and ammonia released from the hydcat. A first, or upstream, end cap 42 receives the exhaust flow from the hydcat and turns it substantially through a further 90 degrees, so that the exhaust flow is now in the opposite direction to that in which it passes through the DOC canister 16. The first end cap 42 has a first end cap inlet 44 and a first end cap outlet 46 which define respective flow paths that lie at substantially 90 degrees to one another. The first end cap outlet 46 may have a cross sectional area which is larger than that of the first end cap inlet 44.

Connected to the first end cap outlet 46 is a SCR canister 48 which contains an SCR coated-on filter (SCRF), which can also be referred to as a diesel particulate filter (DPF), and a SCR catalyst of a known type downstream of the SCRF. The SCR canister 48 lies on the cradle 18 and is substantially parallel with the DOC canister 16. The SCR canister 48 is removably attached to the cradle 18 by straps 20 and fixing arrangements 26 in the same way as the DOC canister 16.

A second, or downstream, end cap 50 is connected to the downstream end of the SCR canister 48. The second end cap 50 has a second end cap inlet 52 and a second end cap outlet 54 which define respective flow paths which are substantially parallel to one another. In other words, the second end cap 50 turns the exhaust flow through substantially 180 degrees after it has exited the SCR canister 48. The second end cap inlet 52 may have a cross sectional area which is greater than the second end cap outlet 54 so as to reduce the diameter of the flow path at this point. The second end cap 50 may also house NOx and ammonia sensors 55, 57 which are used by a SCR controller (not shown) to monitor the performance of the SCR catalyst.

An ammonia oxidation (AMOx) canister 56 lies downstream of the second end cap 50 and houses an AMOx catalyst of a known type. The AMOx canister 56 is mounted on the cradle 18 between the DOC and SCR canisters 16, 48 and lies substantially parallel to those canisters. As with the previous canisters 16, 48 the AMOx canister 56 is removably attached to the cradle 18 using the same type of straps 20 and fixing arrangements 26. The AMOx canister 56 has an exhaust outlet 58 which is in fluid communication with an exhaust pipe 60, which directs the exhaust gas flow to a tailpipe (not shown) and hence to atmosphere.

INDUSTRIAL APPLICABILITY

The manner in which the SCR system 10 operates after installation on a diesel engined vehicle will now be described. Exhaust gas exiting the turbocharger outlet of the diesel engine flows into the exhaust cap 12 via cap inlet 11. The shape of the exhaust cap 12 and the aforementioned increase in cross sectional area of the exhaust flow path between the cap inlet 11 and cap outlet 14 serves to turn the flow 90 degrees to a generally horizontal orientation and also expands the exhaust flow as it flows towards the DOC canister 16. As the exhaust gases flow through the DOC catalyst contained within the DOC canister 16 the DOC catalyst coverts carbon monoxide and hydrocarbons within the exhaust gas into carbon dioxide and water vapour, and some of the nitrogen oxide into nitrogen dioxide.

After flowing through the DOC canister 16, the exhaust flow proceeds into the elbow 36. As the flow turns substantially 90 degrees around the elbow the DEF dosing unit 38 injects DEF into the exhaust flow at a controlled rate dictated by a SCR controller and various sensors communicating with the controller. The injector of the DEF dosing unit 38 may be positioned so that it injects DEF directly onto the hydrolysis catalyst contained within the hydcat canister 40 downstream of the elbow 36. Following the injection of the aqueous urea DEF a thermolysis reaction takes place caused by the heat of the exhaust gas, whereby the DEF is converted into ammonia, isocyanic acid and water vapour. The presence of the water vapour then permits the hydcat to convert the isocyanic acid into additional ammonia and carbon dioxide. The optional mixer plate ensures homogenous mixing of the ammonia and exhaust gas as the exhaust flow leaves the hydcat canister 40 and enters the first end cap 42.

Due to the relative orientation and variation in cross sectional area of the first end cap inlet 44 and the first end cap outlet 46, the first end cap 42 turns the flow through substantially 90 degrees and expands the flow as it enters the SCR canister 48. In the SCR canister 48 the exhaust flow first passes through the SCRF, where particulate matter is trapped by the SCRF. When it is determined that the level of particulate matter trapped in the SCRF has exceeded a certain value, the SCRF is regenerated in a known manner in order to remove the trapped matter.

As the exhaust gases flow through the SCR catalyst the NOx present in the flow reacts with the ammonia, thereby converting the NOx to nitrogen, water and a small amount of carbon dioxide. The exhaust flow then enters the second end cap 50, where the relative orientation and variation in cross sectional area of the second end cap inlet 52 and the second end cap outlet 54 turns the flow through substantially 180 degrees and tapers or shrinks the flow diameter. The flow then enters the AMOx canister 56 where the AMOx catalyst oxidises ammonia remaining within the exhaust flow to limit the amount of ammonia slipping through the system to atmosphere.

By providing a SCR system whose principal components are arranged on a support frame the present invention ensures that the system is as compact as possible whilst being readily accessible for maintenance. Furthermore, by fluidly connecting the various canisters of the SCR system by exhaust passage elbows and/or end caps the present invention provides a compact SCR system in which optimal mixing of exhaust gas and DEF/ammonia is achieved without any detrimental increases in back pressure within the system.

Modifications and improvements may be incorporated without departing from the scope of the present invention.

The invention claimed is:

1. A selective catalytic reduction (SCR) system for treating exhaust gas from a diesel engine, the system comprising:
   a frame;
   a SCR catalyst contained within a SCR canister;
   an upstream endcap located immediately upstream of the SCR canister configured to turn an exhaust gas through 90 degrees;
   an ammonia oxidation catalyst contained within an ammonia oxidation canister; and
   a downstream endcap located immediately downstream of the SCR canister and configured to turn the exhaust gas through 180 degrees between the SCR canister and the ammonia oxidation canister;
   wherein each of the SCR and ammonia oxidation canisters is removably attached directly to the frame by a plurality of straps.

2. The system of claim 1, wherein the SCR and ammonia oxidation canisters are substantially parallel to one another on the frame.

3. The system of claim 1, wherein the SCR canister includes a SCR coated-on particulate filter located upstream of the SCR catalyst.

4. The system of claim 1, further comprising a diesel oxidation catalyst contained within a diesel oxidation canister located upstream of the SCR canister, wherein the diesel oxidation canister is removably attached to the frame.

5. The system of claim 4, wherein all three canisters are substantially parallel to one another, and the ammonia oxidation canister is located between the diesel oxidation and SCR canisters.

6. The system of claim 4, further comprising an exhaust cap located upstream of the diesel oxidation catalyst and connectable to an outlet of the diesel engine, wherein the exhaust cap has a cap inlet and a cap outlet and the cap outlet has a greater cross sectional area than that of the cap inlet.

7. The system of claim 1, further comprising:
   a diesel exhaust fluid (DEF) dosing unit having an injector; and
   an exhaust passage elbow which turns the exhaust gas through substantially 90 degrees upstream of the SCR catalyst;
   wherein the injector is arranged to inject DEF into the exhaust passage elbow.

8. The system of claim 1, further comprising a hydrolysis catalyst upstream of the SCR catalyst, wherein the hydrolysis catalyst is contained within a hydrolysis catalyst canister which is removably attached to the frame.

9. The system of claim 8, wherein the hydrolysis canister also contains a mixer plate downstream of the hydrolysis catalyst.

10. The system of claim 8, wherein the hydrolysis catalyst canister lies substantially at right angles to the SCR and ammonia oxidation canisters.

11. The system of claim 8, wherein the upstream end cap turns the exhaust gas through substantially 90 degrees between the hydrolysis canister and the SCR canister, the upstream end cap having an upstream end cap inlet and an upstream end cap outlet, and wherein the upstream end cap outlet has a cross sectional area which is greater than that of the upstream end cap inlet.

12. The system of claim 1, wherein the downstream end cap has a downstream end cap inlet and a downstream end cap outlet, and wherein the downstream end cap inlet has a cross sectional area which is greater than that of the downstream end cap outlet.

13. The system of claim 1, wherein the frame is supported by a plurality of legs or supports, and each leg or support is secured to the frame by an elastomeric vibration isolating member.

14. A method of assembling a selective catalytic reduction (SCR) system for treating exhaust gas from a diesel engine of a vehicle, the method comprising the steps of:
   providing a frame;
   attaching the frame to the vehicle;
   removably attaching a SCR canister containing a SCR catalyst directly to the frame with a first plurality of straps, and fluidly connecting the SCR canister to an exhaust inlet;
   removably attaching an ammonia oxidation canister containing an ammonia oxidation catalyst directly to the frame with a second plurality of straps; and
   fluidly connecting the ammonia oxidation canister to the SCR canister and an exhaust outlet with a downstream end cap, the downstream end cap turning the exhaust gas through substantially 180 degrees between the SCR canister and the ammonia oxidation canister, the downstream end cap having a downstream end cap inlet and a downstream end cap outlet, the downstream end cap inlet having a cross sectional area which is greater than that of the downstream end cap outlet.

* * * * *